INVENTORS
Ellis H. Born
David S. Raymond
BY Gary L. Smith
David L. Thurston
Wood, Herron & Evans
ATTORNEYS

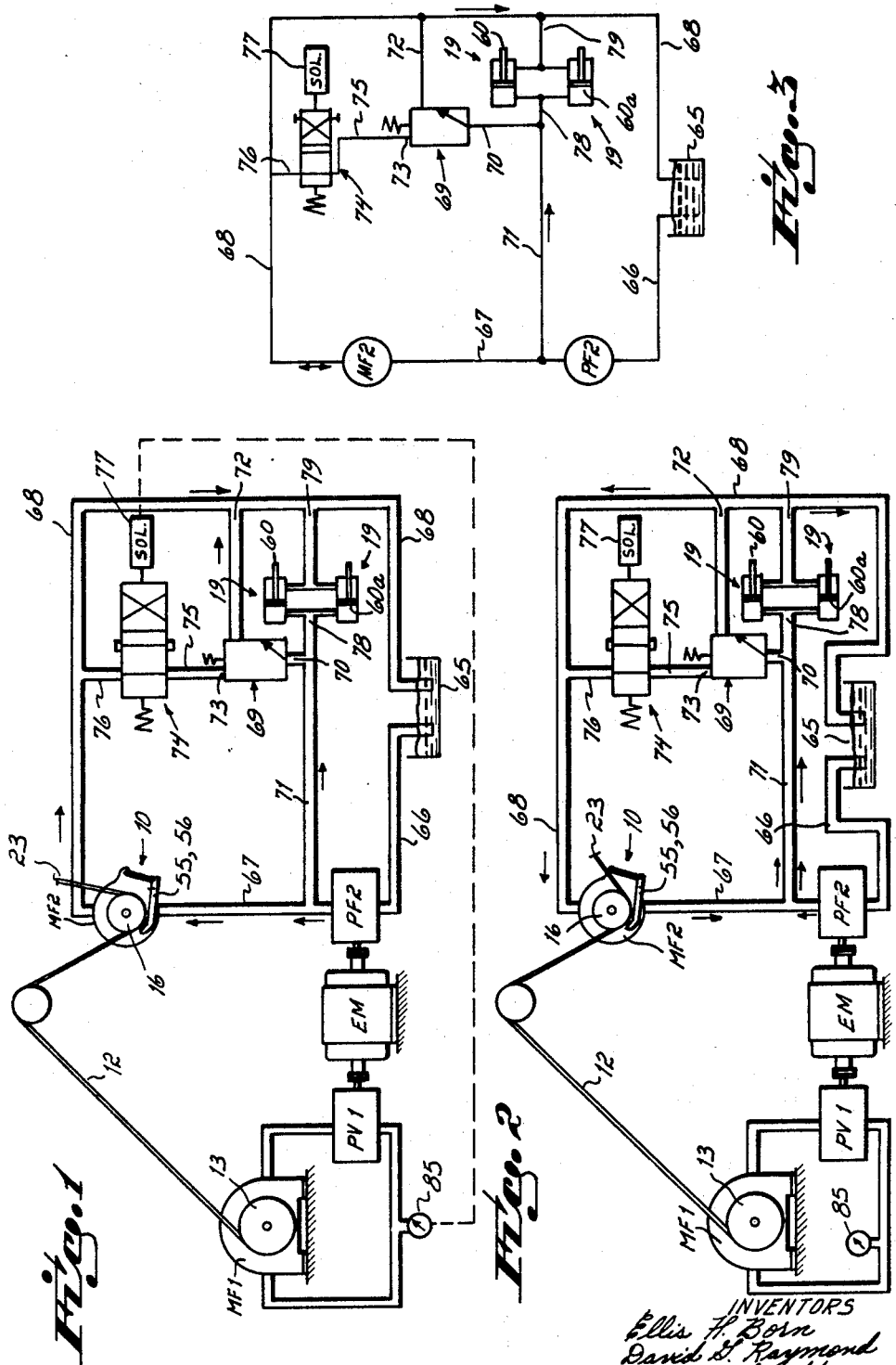

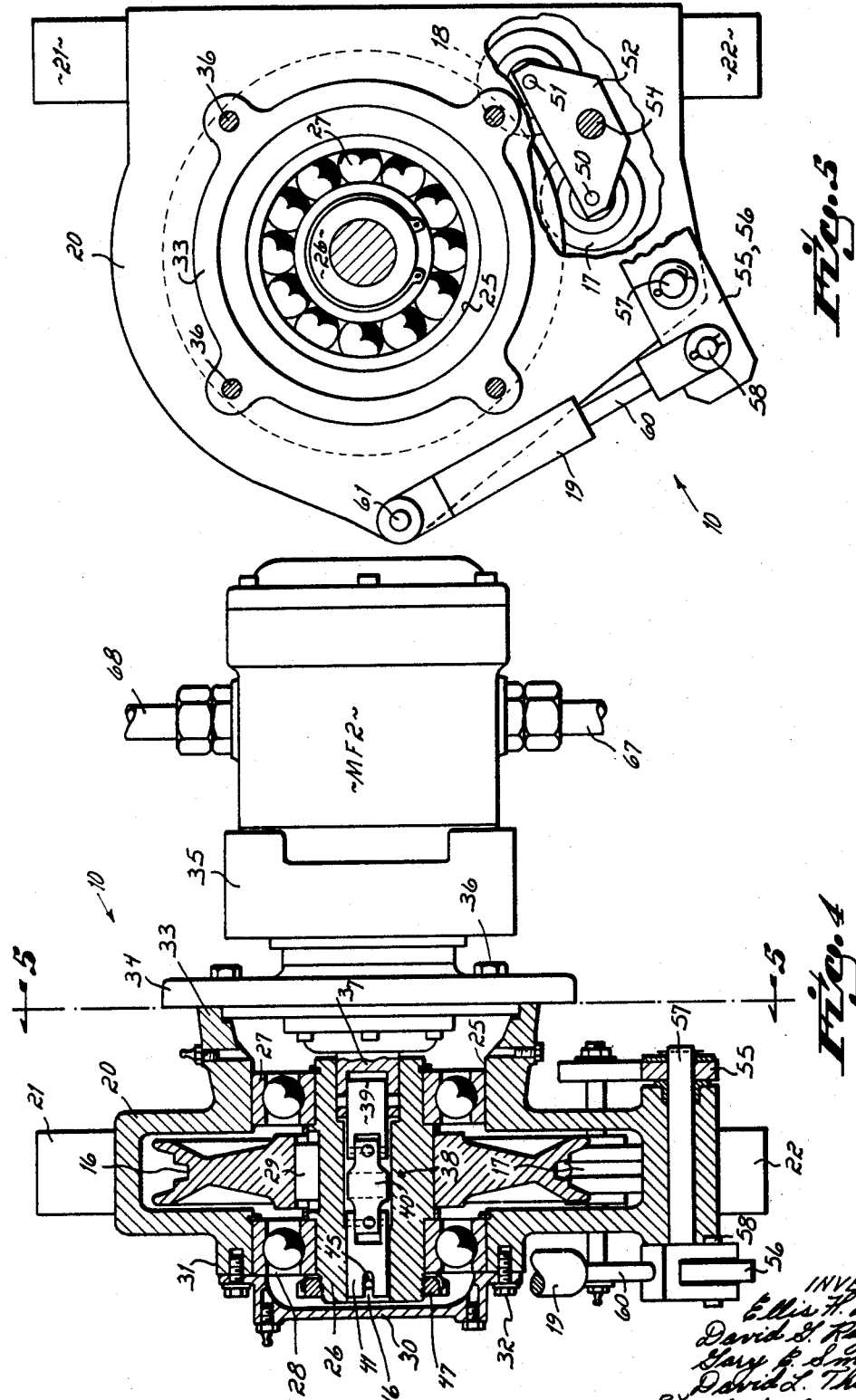

United States Patent Office 3,388,890
Patented June 18, 1968

3,388,890
WINCH CABLE ANTI-SLACK UNIT
Ellis H. Born, David G. Raymond, Gary C. Smith, and David L. Thurston, Columbus, Ohio, assignors to Abex Corporation, New York, N.Y., a corporation of Delaware
Filed Mar. 6, 1967, Ser. No. 620,724
16 Claims. (Cl. 254—175.7)

ABSTRACT OF THE DISCLOSURE

A device for preventing cable from "backlashing" or becoming "birdcaged" as it is payed out or taken in from a motor driven drum or winch. The cable passes over a motor driven pulley operative to pull the cable under tension off of the drum as cable is payed out and operative to maintain a tension on the cable when it is taken in.

Background of the invention

If slack line is allowed to develop on a drum or reel of a winch while the drum is rotating, the line "birdcages" or becomes fouled on the drum so that it is locked against motion in either direction. "Birdcaging" or fouling of the line of a winch can occur as a result of slack in the line during either the paying out or taking in of cable. If the slack occurs while cable is being payed out, it results in an "overriding" turn of cable on the drum which is then trapped by succeeding turns. In the paying in direction, slack results in a loosely spooled cable which can then "bury" itself in the loose outer layers when tension is subsequently applied to the cable.

A primary objective of this invention has been to prevent "birdcaging" or "fouling" of cable on the drum of a motor driven winch. To this end, this invention is operative to maintain a tension on the line as it is payed in or out from the winch drum. The tensioning of the line or cable is accomplished by a motor driven anti-slack unit operative to pull cable off of the drum as the cable is payed out from the drum and operative to apply a tension or resistance through which the cable must pass during return to the reel or drum.

Thus, the anti-slack unit of this invention avoids fouling or birdcaging of the cable by maintaining tension on the cable so that it is never permitted to go slack on the drum.

Summary

Briefly, the anti-slack unit of this invention comprises a pulley or sleeve through which the cable passes and to which it is clamped by pressure loaded friction rollers. The pulley is driven by a fluid motor independently of the winch drum drive motor at a rate which maintains a tension on the cable as it is payed out from the drum. When cable is pulled through the anti-slack unit, the pulley drive motor acts as a drag or brake to apply a tension to the cable as it is spooled onto the winch drum.

The pulley drive motor is preferably a rotary hydraulic motor operable to drive the pulley in a direction to pull cable from the drum when the cable is being payed out by the winch and operable as a pump to apply a drag or bias to the pulley as cable is pulled over the pulley by the winch drum drive motor. The amount of drag applied to the cable by the pulley is regulated by a pressure relief valve or a pressure compensator control through which fluid must pass on the output side of the pump.

Three different embodiments of drive systems are described for supplying power to the anti-slack unit drive motor. Each of these systems has its relative advantages and disadvantages. One system is relatively inefficient but is very inexpensive to install. Another system is very efficient but involves higher equipment costs. The third system represents a compromise between efficiency and cost. Each of these three systems derives its power input from the drive system to the winch drum but the three systems vary in efficiency because of differing degrees of power losses resulting from using or not using the regenerative power available in the anti-slack unit to drive the winch drum when cable is being pulled through the anti-slack unit and spooled back onto the drum.

Of the three systems, the one which is most efficient, but also most expensive to install, utilizes a cross center pressure compensated pump to drive the anti-slack motor. If a ten horsepower anti-slack unit drive motor is used in this system, the power losses attributable to the anti-slack system vary with the speed and direction of winch operation but never exceed two and one-half horsepower, even in the worst operating condition in which cable is being payed onto the winch drum and the anti-slack unit drive motor is being driven in a direction which forces it to act as a pump. Minizing the power losses, of course, reduces the size of drive motor required to operate the winch.

The least efficient of the three drive systems utilizes a constant volume hydraulic pump driven from the winch drive electric motor to drive the anti-slack unit motor. This system does not use any of the regenerative power available in the anti-slack unit to help drive the winch drum when the cable is payed onto the drum and, therefore, experiences a very high energy loss in this condition. In fact, a ten horsepower motor system of this type may generate power losses as high as twenty horsepower when cable is being payed in at the highest possible speed. However, while this system is the least efficient of the three, it is the least expensive to install.

The third system, which is preferred in many heavy duty installations, represents a compromise between cost of installation and efficiency. This system utilizes two constant volume pumps to drive the anti-slack unit motor, one a relatively large capacity pump coupled ot the fluid motor which drives the winch drum, and the second, a relatively small capacity pump which supplies the bias pressure to the anti-slack unit motor. This third system has a maximum power loss of approximately four horsepower in a ten horsepower drive motor installation. As in the case of the two other systems, the least efficient condition occurs when the winch is paying in cable and the anti-slack motor is driven as a pump. This system has one distinct advantage over the other two systems in that it is more easily adaptable to dual tension levels on the cable. It is often desirable to maintain a low tension on the cable when the winch drum is not rotating and to increase this level when cable is either being payed in or out from the drum. By routing the biasing pressure from the smaller capacity pump through one of two different pressure relief valves, the biasing pressure level may be varied under varying operating conditions.

The choice of anti-slack unit drive systems depends upon the relative economics of each installation. At the present time, we prefer the third or compromise system for most heavy duty winch cable installations such as those used aboard ships.

Other objects and advantages of this invention will become more readily apparent from the following description of the drawings in which:

FIGURE 1 is a diagrammatic illustration of a winch drive system which incorporates one modification of the inventive anti-slack unit of this application, the system being illustrated in a condition in which the winch drum is paying out cable.

FIGURE 2 is a view similar to FIGURE 1 but illustrating the system in a condition in which the winch drum is paying in cable.

FIGURE 3 is a diagrammatic illustration of the anti-slack unit drive system portion of the winch drive system of FIGURE 1 illustrating the anti-slack unit in an inactive or freewheeling condition.

FIGURE 4 is a cross-sectional view of the anti-slack unit drive pulley and pulley drive motor.

FIGURE 5 is a cross-sectional view, partially broken away, taken along line 5—5 of FIGURE 4.

Figure 6:
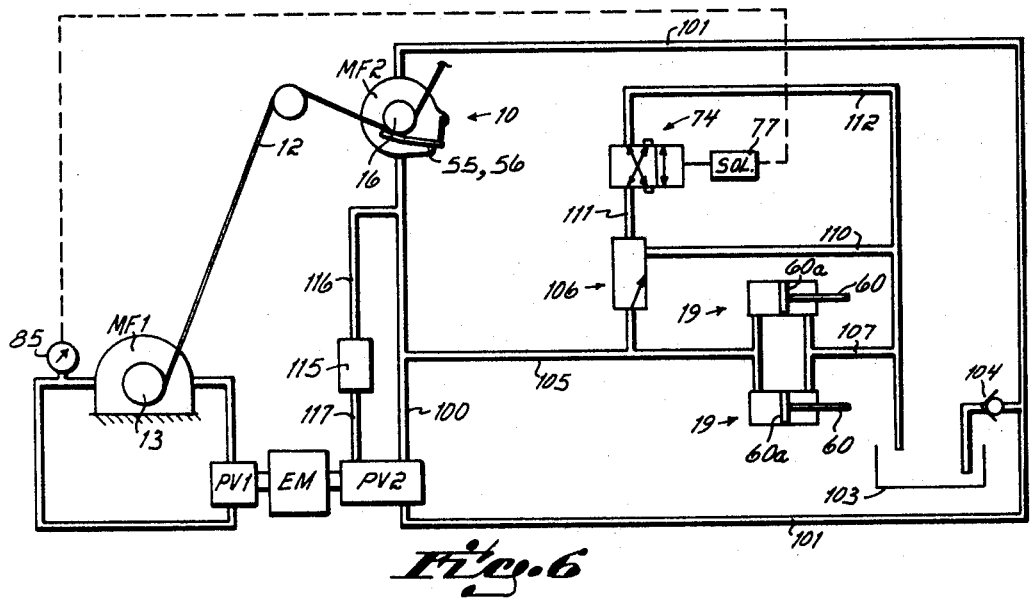
FIGURE 6 is a diagrammatic illustration of a winch drive system incorporating a second, more efficient anti-slack unit.

Referring to FIGURE 1, one modification of the inventive anti-slack unit 10 of this application is illustrated as applied to a conventional hydraulic winch drum 13 drive system. This unit 10 is operable to control tensioning of a cable 12 as it is payed out or taken in on the drum 13. Thus the unit prevents slack from occurring in the cable on the drum and, so long as slack is avoided, there is no chance of the cable 12 becoming fouled or "birdcaged" on the drum.

In this winch drive system, the drum 13 is driven by a hydraulic motor MF–1 which is in turn driven by a fluid pump PV–1. An electric motor EM drives the pump PV–1 at a fixed rate of rotation. As is conventional in this type of winch drive, changes in winch drum speed or direction of rotation are controlled or varied by changing the position of the pump hanger through a manual or automatic control system (not shown).

While in this system, the winch is driven by a hydraulic motor MF–1, it could as well be driven by any other motorized drive system since the drive to the winch drum forms no part of the inventive subject matter of this application.

Referring to FIGURES 4 and 5, it will be seen that the anti-slack unit 10 comprises a motor driven pulley 16 and a pair of friction rollers 17, 18 between which the cable 12 is clamped in order to prevent slippage between the cable 12 and the pulley 16. The rollers 17 and 18 are preferably movable away from the pulley 16 under the control of a pair of hydraulic motors 19 so as to permit the cable 12 to be threaded over the pulley 16. When the motors 19 are subsequently actuated, as is explained more fully hereinafter, the cable is securely clamped to the pulley 16.

The pulley 16 is rotatably mounted within a housing 20. This housing 20 is supported from a pair of support posts 21, 22 which extend vertically from the housing and are adapted to be received in stationary support brackets (not shown). Preferably, the support posts 21, 22 are cylindrical in shape so as to permit the housing to freely pivot about the posts in the event that the free end 23 (FIGURE 1) of the cable is moved laterally relative to the pulley.

A pulley support sleeve 26 is rotatably journalled within the housing upon ball bearing raceways 27, 28. The pulley 16 is drivably connected to this sleeve 26 by a key 29 so that rotation of the sleeve 26 results in rotation of the pulley 16 and vice-versa.

The housing 20 has an axial aperture or bore 25, one end of which is closed by a cap 30 connected to a hub section 31 of the housing by bolts 32. At the opposite end, the aperture 25 is closed by a flange 34 of the housing 35 of a motor MF–2 which is attached to a hub section 33 of the housing by bolts 36.

Motor MF–2 is a rotary hydraulic motor having an output shaft 37 drivingly keyed through a universal joint 38 to the pulley support sleeve 26. A three piece universal joint having three serially connected sections 39, 40, 41 pinned together connects the motor output shaft 37 to the sleeve 26. The endmost section 41 of the universal joint is connected to the drive sleeve 26 by a drive pin 45 which extends through an aperture (not shown) of sleeve 26 and a slot 46 in the end section 41. A nut 47 threaded over the end of the sleeve 26 holds the pin 45 in place.

By providing the universal joint 38 between the motor driven shaft 37 and the pulley 16, the anti-slack unit accommodates some relative deflection of the drive sleeve 26 without causing the drive shaft 37 to move relative to the housing 35 of the drive motor MF–2. Thus, this drive connection minimizes frictional wear of the drive motor which otherwise would occur because of variable load conditions on the output shaft resulting from variable load conditions on the cable.

Referring particularly to FIGURE 5, it will be seen that the two frictional drive rollers 17, 18 are rotatably journalled upon a pair of support pins 50, 51 which are in turn supported upon a pair of rocker arms 52. The rocker arms 52 are pivotally supported upon a support shaft 54, the ends of which are supported in the outer ends of a pair of cantilever arms 55, 56. Both of the arms 55, 56 are pivotally supported upon a support shaft 57 which is in turn mounted within the housing 20. At their lower ends, each of the arms 55, 56 is pivotally attached by a pin 58 to a piston rod 60 of the hydraulic motors 19. The cylinders of the motors 19 are pivotally attached by pivot pins 61 to the housing 20. Thus, when the piston rods 60 of the motors 19 are extended, the rollers 17 and 18 are caused to move toward the pulley 16 so as to clamp the cable 12 between the pulley 16 and the rollers 17 and 18.

Referring back to FIGURE 1, it will be seen that the fluid motor MF–2 is driven by a constant volume fluid pump PF–2. Preferably, this pump is driven from the electric motor EM which also drives the pump PV–1 of the winch drive system.

The intake port of the anti-slack unit pump PF–2 is connected to a tank 65 or source of fluid by a conduit 66 and the outlet port is connected to the intake port of the anti-slack unit drive motor MF–2 by a pressure conduit 67. From the motor exhaust port fluid flows to the tank 65 through an exhaust conduit 68.

A pressure relief valve 69 is inserted between the pressure conduit 67 and the exhaust conduit 68. This valve 69 has an inlet port 70 connected by a conduit 71 to the pressure line 67 and an exhaust port connected to the exhaust line 68 by a conduit 72. It also has a vent port 73 connected to the low pressure or exhaust line 68 through a solenoid actuated valve 74 and a pair of conduits 75, 76. The connection between the pressure relief valve 69 and the solenoid valve 74 is such that energization of the solenoid 77 of the valve 74 blocks the free flow path between the inlet port 70 of the pressure relief valve and the exhaust conduit 68. Thus when the solenoid 77 is energized, pressure in the conduit 71 must be equal to the pressure required by the adjustment of the valve 69 to break through the valve 69 to the exhaust conduits 72 and 68.

A conduit 78 connects the high pressure lines 67 and 71 to one side of the pistons 60a of motors 19, the opposite sides of the pistons being connected by a conduit 79 to the exhaust or low pressure line 68. Thus, when the solenoid 77 is energized, a pressure differential is established between the lines 78, 79 so that the pistons 60a are moved downwardly, as viewed in FIGURE 5, and the rollers 17, 18 are moved into clamping engagement with the cable.

In operation, the pump PF–2 supplies a constant volume of fluid to the conduit 67 irrespective of whether the winch drum is paying cable in or out. The pressure of this fluid in conduit 67 is determined by the setting of the pressure relief valve 69 and by the condition of the solenoid valve 74. If the solenoid 77 is energized, all of the volume of this pump PF–2 must either pass through the motor MF–2 or through the pressure relief valve 69 and conduits 72, 68 to the tank. The pressure of the fluid in line 67 is then operative to actuate the motor MF–2 so as to pull cable off of the drum 13 if the drum is paying out cable or to oppose rotation of the motor MF–2 if the drum is paying in cable. The volume of fluid which flows through the motor MF–2 is controlled by the speed of the cable over the pulley 16.

Referring to FIGURE 1, the winch and anti-slack unit are illustrated in a condition in which the drum 13 is paying out cable and the anti-slack unit 10 is activated by energization of the solenoid 77. In this example, it is assumed that the pump PF–2 has a capacity of 10 gallons per minute. The full capacity of the pump PF–2, 10 gallons per minute, must either pass through the motor MF–2 into the exhaust conduit 68 or through the relief valve and line 72 to exhaust. If the winch drum 13 is operated very slowly, the pulley 16 and thus the motor MF–2 are rotated very slowly so that very little fluid passes through the motor MF–2 into the exhaust conduit 68. The remainder of the 10 gallons per minute must then flow through conduit 71 and pressure relief valve 69 into the exhaust conduits 72 and 68. The force applied to the cable to pull it off of the winch drum 13 is then dependent upon and a function of the pressure setting of the pressure relief valve 69.

Referring now to FIGURE 2, the system is illustrated in a condition in which the anti-slack unit is still activated by energization of the solenoid 77 but the winch drum is being operated to pay in cable onto the drum 13. Under these circumstances, the pump PF–2 operates to pump 10 gallons per minute into the conduit 71. Since none of the flow from the pump PF–2 can now pass through the motor, which is being driven in reverse by the cable, the motor MF–2 now acts as a pump, forcing fluid to flow from conduit 68 into conduit 67, at a rate which is determined by the linear speed of the cable over the pulley. Under these circumstances, and assuming motor MF–2 has a maximum capacity of 10 gallons per minute, the flow through the pressure relief valve 69 into exhaust conduit 72 would vary between 10 and 20 gallons per minute, depending upon the linear speed of the cable. From the conduit 72, 10 gallons per minute would flow back into the tank and simultaneously, the remainder of the fluid flowing in line 72 would flow back to the motor MF–2. Under these circumstances, with the motor MF–2 acting as a pump forcing fluid through the pressure relief valve 69, the motor MF–2 acts as a brake on the pulley so as to apply a tension to the cable 12 as the winch drum pulls the cable over the pulley.

Referring to FIGURE 3, the anti-slack unit is illustrated in an inactive condition with the solenoid 77 de-energized. In this condition, the motor MF–2 is free wheeling since the pressure relief valve 69 is effectively by-passed. In this condition, the pump PF–2 continues to pump 10 gallons per minute of fluid, all of which is free to flow at atmospheric pressure through conduits 71, 70, 75, and 76 into the exhaust conduit 68. Under these circumstances, the pressure in conduits 78 and 79 is equal so that there is an equal pressure acting upon opposite sides of the pistons 60a of motors 19 and the rollers 17, 18 exert no clamping pressure on the cable. With the pulley 16 thus freewheeling, any fluid passed through the motor MF–2 while it is acting as a pump is simply returned via conduits 71, 70, 75, and 76 back into the exhaust conduit 68. Alternatively, if the winch drum 13 is operated in a direction to pay out cable, the motor MF–2 rotates in a direction to pull fluid from conduit 67 into conduit 68. In both cases, however, there is no net pressure buildup between the intake and outlet ports of motor MF–2 so that the motor MF–2 has no net effect upon the cable.

To minimize the size of electric motor required to drive the system, a pressure actuated switch 85 is preferably connected to the high pressure line between the pump PV–1 and motor MF–1. This switch is connected in series with the solenoid 77 so that high pressure in this line opens the circuit to the solenoid 77 and de-energizes it. Since the pressure in this line is a function of the tension in the cable, this switch is only actuated at very high tension levels in the cable when there is absolutely no necessity or purpose to be served by adding the tensioning of the anti-slack system to the already high tension levels of the cable. Thus, the addition of this simple pressure switch enables the power requirement of the electric motor EM to be reduced. By way of illustration, assume that the motor EM is required to drive the drum and take in cable with a maximum tension of 7000 pounds tension on the cable. If the anti-slack system adds 250 pounds tension to the cable, the pressure switch may be set so that it automatically de-energizes the solenoid 77 and enables the anti-slack system to be freewheeling at tensions above 2000 pounds. Thus the motor EM is never required to handle both the maximum tension loads plus the tension of the anti-slack unit, or 7250 pounds tension in the example.

Referring now to FIGURE 6, there is illustrated another more efficient anti-birdcaging or anti-slack system than that shown in FIGURE 1. This system minimizes energy losses resulting from its attachment to the winch drive system and thereby minimizes the power requirements of the electric motor EM.

Figure 7:
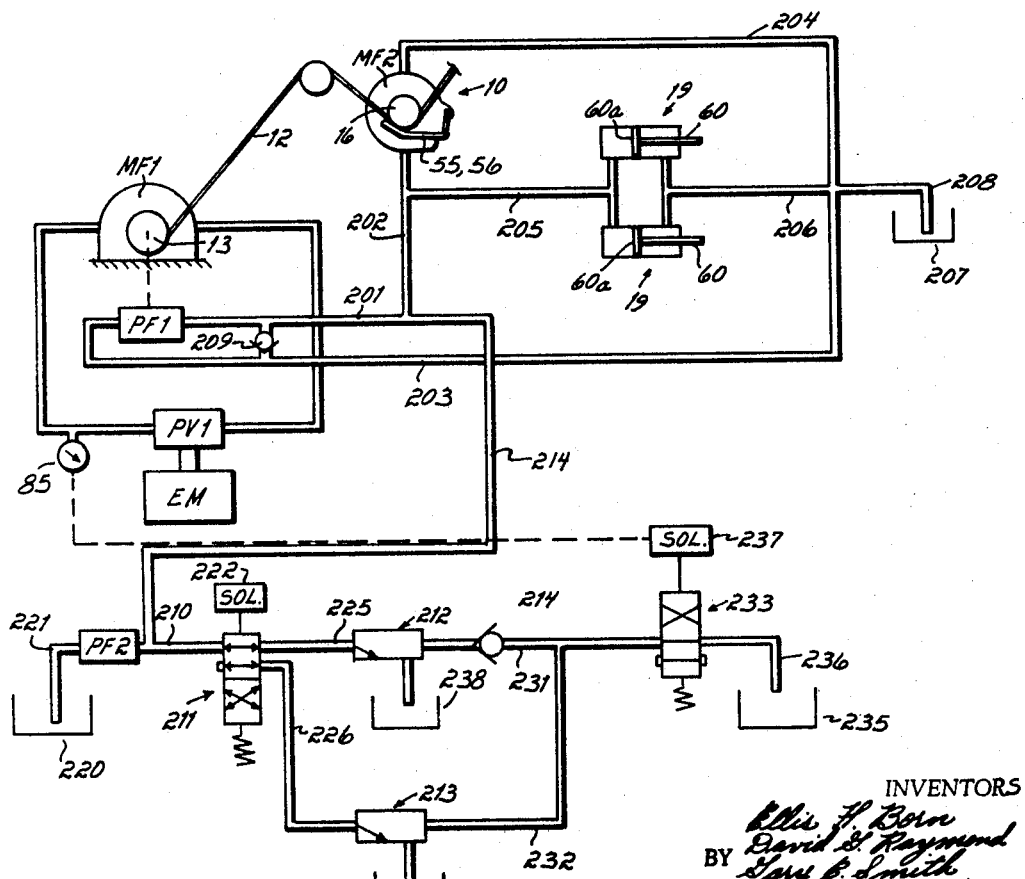
FIGURE 7 is a diagrammatic illustration of a winch drive system incorporating a third modification of the anti-slack unit.

The winch drive and the anti-slack unit 10 of this modification and the following modification of FIGURE 7, are identical to the corresponding parts of the winch drive system of FIGURE 1 and, therefore, similar components have been given identical numerals throughout the description of these modifications.

When operated in the pay out direction, the anti-slack unit pump PV–2 of this system supplies only so much fluid as is required to drive the anti-birdcaging unit 10 at a speed and with a pressure sufficient to maintain a preset tension on the cable. In other words, the pump PV–2 supplies only as much fluid to the motor MF–2 in the pay out direction as is required to operate the motor MF–2 and no fluid is dumped through the pressure relief valve 106 into tank. The pressure relief valve 106 in this embodiment is provided only as a safety valve.

In the pay in direction, this system utilizes an energy regenerative feature to minimize power losses. The motor MF–2 then acts as a pump supplying fluid to the pump PV–2 so that the pump PV–2 acts as a motor to drive the electric motor EM. To this end, the pump PV–2 is a conventional cross-center pressure compensated pump rather than a fixed volume pump as was the case with the system illustrated in FIGURE 1.

As may be seen in FIGURE 6, this energy regenerative drive system comprises the electric motor EM operative to drive the variable volume pump PV–1 at a fixed speed. The pump PV–1 is hydraulically connected to the winch drum drive motor MF–1 and is operative to drive the motor MF–1 at a variable speed and in opposite directions depending upon the setting of the hanger position of pump PV–1. The hanger setting may be controlled either manually or by an automatic control system such as that shown in application Ser. No. 496,408 filed Oct. 15, 1965, and assigned to the assignee of this application. Motor MF–1 is mechanically coupled to the drum 13 so that the speed of the motor MF–1 controls the speed of rotation of the drum 13 and thus the rate at which the cable 12 is payed out or taken in from the drum.

Electric motor EM also drives the cross-center pump PV–2 at a fixed speed. The high pressure port of pump PV–2 is connected via a conduit 100 to the high pressure side of motor MF–2 while the low pressure side of the motor MF–2 is connected via a fluid conduit 101 to the intake or low pressure side of the cross-center pump PV–2. Conduit 101 is also connected to a source of fluid or tank 103 through a one way check valve 104 so that replenishing fluid to make up for leakage of pump PV–2 and motor MF–2 may be derived from the tank 103.

The high pressure conduit 100 is also connected via a conduit 105 to the pressure relief valve 106 and to the high pressure side of the motors 19. As was the case with the motors 19 of the system illustrated in FIGURE 1, the low pressure sides of the two motors 19 are connected to the tank 103 via a conduit 107.

The output side of the pressure relief valve 106 is connected by a conduit 110 to tank 103 while the vent line 111 of the valve 106 is connected to the tank 103 through a solenoid operated four-way valve 74 and a conduit 112. The valve 74 is actuated by a solenoid 77 and is identical in structure and function to the valve 74 of the system illustrated in FIGURE 1.

The hanger position of the cross-center pump PV–2 is controlled by a conventional cross-center pressure compensator 115. This compensator 115 is a conventional commercially available valve which has its input side connected via a conduit 116 to the high pressure conduit 100 of the anti-slack unit 10 drive motor MF–2. The output side of the pressure compensator 115 is connected via a conduit 117 to a cylinder (not shown) of the cross-center pump such that the pressure compensator controls the position of the cylinder which in turn controls the position of the hanger of the cross-center pump PV–2.

Operation of the anti-slack system illustrated in FIGURE 6 is controlled by the solenoid 77. When this solenoid is de-energized, the pressure relief valve 106 is effectively by-passed and the high pressure line 100 is connected by the conduits 105, 111, and 112 to tanks so that there is no buildup of pressure in the conduit 100.

When the solenoid 77 is energized, the vent 111 of the pressure relief valve 106 is blocked so that the pressure in the conduit 100 of the drive system to the motor MF–2 builds up to the pressure setting of the pressure relief valve 106 or the pressure setting of the cross-center compensator valve 115. In actuality, the setting of the compensator valve 115 is less than that of the pressure relief valve 106 so that the pressure relief valve 106 functions only as a safety valve to permit the blow off of pressure in the event that it builds up excessively in the line 100. As the pressure in line 105 builds up to the setting of the valve 115, it causes the pressure in line 106 to build up on the high pressure side of the cylinders 19 so that the pistons 60 are moved in a direction to clamp the cable between the rollers 17, 18 and the pulley 16.

When the hanger of the pump PV–1 is positioned (either manually or by some control circuit, not shown) so as to operate the motor MF–1 to pay out cable, the hanger bias of pump PV–2 causes the pump PV–2 to pump fluid from the low pressure line 101 to the high pressure line 100. This results in a pressure buildup in line 100 until the pressure in line 100 is equal to the pressure setting of the cross-center pressure compensator valve 115. The pressure of the fluid in the line 100 is then operative to drive the motor MF–2 so as to pay out cable over the pulley 16 and maintain a tension on the cable 12 between the pulley 16 and drum 13 as determined by the pressure setting of the compensator 115. Since the cable 12 is clamped to the pulley 16, the rotational speed of pulley 16 governs the speed at which the motor MF–2 rotates. As the speed of the motor MF–2 increases upon increased speed of the cable 12, the pump PV–2 supplies fluid at an increasing rate to the motor MF–2 while maintaining the pressure in the line 100 at the pressure setting of the compensator 115. This is accomplished by changing or increasing the hanger angle of the pump PV–2. As the motor MF–2 slows, upon slower rates of pay out of cable 12, the pressure compensator control 115 reduces the hanger angle or moves the hanger (not shown) of the pump PV–2 back toward a zero position in which no fluid is passed through the pump.

It is important to note that with this full energy regeneration system, the pump PV–2 only pumps so much fluid into the high pressure conduit 100 of the fluid circuit as is required by the speed of the motor MF–2. The anti-slack drive system never wastes energy during pay out of the cable by pumping excess fluid through the pressure relief valve 106 to tank. Thus the energy losses of this system are greatly reduced in comparison to those of FIGURE 1 in which the pump PV–2 is always pumping some fluid to tank except at the full operational speed of the winch drum.

When operated in the pay in direction so that cable is spooled onto the drum 13, the motor MF–2 is driven as a pump by the cable 12 passing over the pulley 16. As the cable changes from a pay out to a pay in mode, the pulley 16 and thus the motor MF–2 go through a condition of zero cable speed and zero speed of the motor MF–2. In this condition, the cross-center pump PV–2 continues to act as a pump supplying just enough fluid into the high pressure line 100 to maintain the pressure in the line 100 at the setting of the cross-center pressure compensator valve 115. This pressure is insufficient to rotate the drum 13 but biases the motor MF–2 in a pay out direction so that it maintains tension on the cable 12.

As the drum 13 begins to take up cable in the pay in direction, the pulley 16 reaches a nominal speed at which the motor MF–2, acting as a pump, supplies sufficient fluid into the line 100 to maintain the pressure setting of the compensator 115. At this speed the cross-center pump PV–2 goes through its zero position in which it is neither pumping fluid into the line 100 or demanding fluid from the line 100. As the speed of the pulley 16 increases, upon increased winch drum speed, the hanger of pump PV–2 goes through its zero position and begins to act as a motor to drive the electric motor 9. Thus, in this condition, energy losses through the anti-slack unit drive sysems are minimized because of the energy regeneration resulting from the pump PV–2 acting to drive the electric motor EM. The only energy losses are those attributable to leakage and mechanical inefficiencies in the motor MF–2 and the cross-center pump PV–2. This is in contrast to the system illustrated in FIGURE 1 in which, at the maximum speed of the motor MF–2 in the pay in direction, the motor MF–2 pumps its maximum capacity of fluid to tank while simultaneously the constant volume pump PV–2 pumps its full capacity into the tank where the energy is all lost.

As an alternative or modification of the embodiment of FIGURE 6, a conventional single side of center pressure compensated pump could be substituted for the cross-center pressure compensated pump PV–2. In the event of such a substitution, the system operates in exactly the same manner as the system of FIGURE 6 in the pay out mode. In operating in the pay in mode, excess oil is spilled over the relief valve 106 with a consequent power loss. This loss, however, is less than the power losses experienced with the system illustrated in FIGURE 1.

Referring now to FIGURE 7, there is illustrated still another embodiment of the anti-slack system of this application. This embodiment differs from that previously described principally that it is a partially regenerative system which operates on two pressure levels, a low pressure level when the drum 13 is stationary and a higher pressure level when cable 12 is being payed in or out.

In this system, as in both of those previously described, the winch drum 13 is driven by a motor MF–1 which is in turn driven from a pump PV–1, the pump PV–1 being driven by an electric motor EM.

The primary source of power for driving the anti-slack unit motor MF–2 is a constant volume pump PF–1 which is driven through a mechanical connection to the winch drum drive motor MF–1. The high pressure port of the pump PF–1 is connected by conduits 201 and 202 to the high pressure port of the anti-slack drive motor MF–2 while the low pressure port is connected by conduits 203 and 204 to the low pressure port of the motor MF–2. Thus, the pump PF–1 and motor MF–2 are connected in a closed hydraulic loop.

The cable clamp motors 19 for clamping the cable 12 to the pulley 16 have their high pressure ports connected via a conduit 205 to the high pressure line 202 and their low pressure ports connected via a conduit 206 to the low pressure line 203. To replace oil lost through leakage and difference in volume between the pump PF–1 and motor MF–2, the low pressure line 203 is connected to a tank 207 by a line 208.

Bias on the anti-slack drive motor MF–2 is provided by a fluid pump PF–2 connected to the line 201 by a conduit 210 and a conduit 214. The pump PF–2 is a constant volume pump having a relatively small capacity, as for example two gallons per minute, as compared to the capacity of pump PF–1 which has a capacity, in one preferred embodiment, of ten gallons per minute. This pump PF–2 receives fluid from a tank 220 through a line 221. The output of the pump PF–2 is supplied to the intake ports of either the pressure relief valve 212 or the pressure relief valve 213, depending upon whether the solenoid 22 of valve 211 is energized or de-energized. When de-energized, the valve 211 connects the pump PF–2 to the intake port of the pressure relief valve 212 through a conduit 225. When energized, the solenoid valve 211 connects the pump PF–2 to the higher pressure, pressure relief valve 213 via line 226.

In one preferred embodiment, the pressure relief valve 212 maintains a pressure in the line 225 of 1000 p.s.i.

The vents of the pressure relief valves 212 and 213 are connected in parallel via conduits 231, 232 to a solenoid actuated four-way valve 233. When de-energized, the valve 233 connects the vent conduits 231, 232 to tank 235 via a conduit 236. When energized, the valve 233 blocks the flow through the vents 231, 232 of the pressure relief valves 212 and 213. A check valve 229 in conduit 231 blocks flow from vent conduit 232 into conduit 231.

Operation of this anti-slack system is controlled by the solenoid 237 of valve 233. When the solenoid 237 is de-energized, the conduits 231, 232 of the pressure relief valves 212 and 213 are opened or connected to tank so that there can be no pressure buildup in the pressure relief valves 212 and 213. As a consequence, the flow of fluid from the pump PF–2 is supplied directly through the lines 210 and 225 to the tank 238. If the solenoid 222 of the valve 211 is energized at this time (when the solenoid 237 of the valve 233 is de-energized), the output of pump PF–2 is supplied to tank 239 through the conduits 210, 226 and valve 213. In either case, there is no pressure buildup in the pressure relief valves 212 and 213 and consequently, no pressure buildup in the line 214. The anti-slack unit 10 and the pump PF–1 are thus freewheeling.

When the anti-slack system is turned on, the solenoid 237 of the valve 233 is energized by a conventional electrical control system (not shown). This results in the vents 231, 232 of the pressure relief valves 212 and 213 being blocked so that there is a pressure buildup on the intake side of the valves. In the case of the valve 212 which, in one preferred embodiment, is set for 1000 p.s.i., the pressure in the line 225 builds to 1000 p.s.i. if the line 225 is connected by the solenoid valve 211 to the output of the pump PF–2. Similarly, the pressure on the intake side of the pressure relief valve 213 builds to 2000 p.s.i. if the intake port of the valve is connected to the output of the pump PF–2. The one of the two pressure relief valves 212, 213 which is connected to the pump PF–2 is controlled by the energization or de-energization of the solenoid 222 of the valve 211. This solenoid is preferably energized automatically by a control circuit (not shown) through the mechanism which controls rotation of the drum 13 so that the solenoid becomes energized automatically whenever the drum is rotated.

In the de-energized state of the solenoid 222 (in which the drum is not rotating) this system is operable to maintain a 1000 p.s.i. bias on the anti-slack unit drive motor MF–2 so that the motor maintains a tension on the cable and prevents the cable from going slack. This pressure is supplied to the high pressure line 202 of the anti-slack motor MF–2 from the pump PF–2 through the lines 210 and 214. In this condition of the control circuit, the pump PF–2 supplies whatever capacity is required by leakage and difference in volume between the motor MF–2 and the pump PF–1 to maintain the pressure in the line 214 at 1000 p.s.i. The remainder is spilled through the pressure relief valve 212 into the tank 238.

Upon initiation of rotation of the drum 13, the solenoid 222 is automatically energized by a control circuit (not shown) so that the intake port of the valve 211 is connected to the conduit 226 and thus to the intake port of the pressure relief valve 213. Thus, the pressure of the value 213 builds to 2000 p.s.i. as does the pressure in the connected conduits 210 and 214. This pressure is used to maintain biasing pressure in the high pressure leg 202 of the fluid control circuit to the motor MF–2.

With the maximum diameter of cable wrap on the winch drum 13 in the pay out direction, most of the capacity of the pump PF–2 is required to supply fluid to the line 202 so as to make up for leakage, and the difference in pump PF–1 volume versus motor MF–2 demand. On the average wrap in the pay out mode, the capacity of pump PF–1 is such that it is capable of supplying the full capacity required by the motor MF–2 and the output of the pump PF–2 serves simply as a biasing pressure and is all fed through the relief valve 213 to tank. At less than the average wrap on the drum 13 in the pay out direction, the capacity of the pump PF–1 is greater than the capacity of the motor MF–2 so that excess fluid is pumped through the conduits 214, 210, 226 and the relief valve 213 to tank 239.

In the pay in mode of operation, when the motor MF–2 is acting as a pump, with greater than the average wrap, the motor MF–2 capacity is greater than that of the pump PF–1 so that the excess fluid is pumped through the conduits 214, 210, 226 and relief valve 213 to the tank 239. On the average wrap, the capacity of the motor MF–2 matches that of the pump PF–1 so that the full capacity of the pump PF–2 is pumped directly through the pressure relief valve 213 to the tank 239. With less than the average wrap in the pay in mode, the capacity of the pump MF–2 is les than that of the pump PF–1 so that the pump PF–2 makes up the differences between the capacities so as to maintain a biasing pressure in the high pressure line 202. Thus, the make up pump PF–2 serves in both modes of operation and at all speeds to maintain a biasing pressure of 2000 p.s.i. on the anti-slack unit drive motor MF–2.

As will now be readily apparent, the system illustrated in FIGURE 7 is most efficient with more than the average wrap on the drum 13 in the pay out direction when nearly all of the capacity of the pumps PF–1 and PF–2 is required to drive the motor MF–2, and with less than the average wrap in the pay in mode when nearly all of the capacity of the pump PF–2 and the motor MF–2 is required to drive the pump PF–1. In both of these situations, very little of the flow from the pump PF–2 passes through the pressure relief valve 213 to tank and is wasted. In any event, the maximum inefficiency of this system occurs when the full capacity of the pump PF–2 (a relatively low capacity pump in relation to the pump PF–1 and motor MF–2) and the maximum excess volume in the high pressure loop of the system is passed through the pressure relief valve 213 to tank 239.

The system illustrated in FIGURE 7 is as much as ten times as efficient as the system illustrated in FIGURE 1 and is approximately half as efficient as the system shown in FIGURE 6. However, for many applications, we prefer the system illustrated in FIGURE 7 because the cost of two constant volume pumps is much less than the cost of a single cross-center pump having the same capacity. This last system (shown in FIGURE 7) also has the advantage of the double tension levels which are relatively easy to accomplish with this system but much more difficult to accomplish in a full regenerative system such as that shown in FIGURE 6.

The system illustrated in FIGURE 1 has the advantage of being the least expensive to install but has the decided disadvantage of being the least efficient.

While three preferred embodiments of a winch cable anti-slack system have been illustrated and described herein, those skilled in the arts to which this invention pertains will readily appreciate numerous modifications and changes which may be made without departing from the spirit of our invention. Therefore, we do not intend to be limited except by the scope of the appended claims.

Having described our invention, we claim:

1. For use in combination with a drum having cable stored thereon and a motor driven drive mechanism for rotating said drum to pay out or take in cable, the improvement which comprises an anti-slack unit operable to prevent slack from occurring in the cable on the drum when said drum is rotated to either pay out or take in cable, said unit including a pulley over which said cable passes, a rotatable fluid motor coupled to said pulley for driving said pulley so as to maintain tension in the cable between said pulley and said drum when said drum is rotated in a direction to pay out cable, said pulley being operable to drive said fluid motor when said drum is rotated in a direction to take in cable, and means operable to apply a braking force to rotation of said fluid motor when said drum is rotated in a direction to take in cable so as to establish tension in said cable between said pulley and said drum.

2. For use in combination with a drum having cable stored thereon and a motor driven drive mechanism for rotating said drum to pay out or take in cable, the improvement which comprises an anti-slack unit operable to prevent slack from occurring in the cable on the drum when said drum is rotated to either pay out or take in cable, said unit including a pulley over which said cable passes, a fluid motor for driving said pulley when said drum is rotated in a direction to pay out cable, said pulley being operable to drive said fluid motor when said drum is rotated in a direction to take in cable, a source of fluid pressure coupled to said fluid motor by an interconnecting fluid conduit, and a valve coupled to said conduit and operative to maintain a back pressure in said fluid conduit when said drum is taking in cable and said fluid motor is being driven by said pulley.

3. The anti-slack unit of claim 2 wherein said source of fluid pressure comprises a constant volume pump.

4. The anti-slack unit of claim 2 wherein said source of fluid pressure is operatively coupled to said drum drive mechanism so that said anti-slack unit acts as a regenerative power system when said drive mechanism is operated so as to take in cable onto said drum.

5. The anti-slack unit of claim 4 wherein said source of fluid pressure is a cross-center pressure compensated pump.

6. The anti-slack unit of claim 4 wherein said source of fluid pressure is a pressure compensated pump.

7. The anti-slack unit of claim 2 wherein said source of fluid pressure comprises a pair of constant volume pumps.

8. The anti-slack unit of claim 7 wherein one of said constant volume pumps is mechanically coupled to said drum so as to operate at a speed and flow which is a function of the rate of rotation of said drum, the other one of said constant volume pumps being operable to supply a biasing pressure to said pulley drive motor.

9. For use in combination with a drum having cable stored thereon and a motor driven drive mechanism for rotating said drum to pay out or take in cable, the improvement which comprises an anti-slack unit operable to maintain tension on said cable and prevent slack from occurring in the cable on said drum when said drum is rotated to either pay out or take in cable, said unit including a pulley over which said cable passes, a motor for driving said pulley so as to establish a tension in said cable between said drum and said pulley when said drum is rotated in a direction to pay out cable, means including said motor operable to apply a braking force to turning movement of said pulley when said drum is rotated in a direction to take in cable so as to establish tension in said cable between said pulley and drum, and means for rendering said anti-slack unit inoperative to tension said cable whenever the tension in said cable exceeds a preset value.

10. For use in combination with a drum having cable stored thereon and a motor driven drive mechanism for rotating said drum to pay out or take in cable, the improvement which comprises an anti-slack unit operable to maintain tension on the cable when said drum is rotated to pay out cable, said unit including a pulley support housing, a pulley mounted for rotation within said housing, said pulley having an apertured hub section, a pulley drive motor mounted on one side of said housing, said pulley drive motor having an output shaft extending through the aperture of said pulley hub section, the outer end of said shaft being drivably keyed to said pulley hub section, said shaft having a universal joint located within said pulley hub section, a pair of friction drive rollers cooperable with said pulley to clamp said cable between said rollers and said pulley, said rollers being pivotally mounted upon a movable support member, and means for moving said support member toward said pulley so as to clamp said cable between said rollers and said pulley so that said cable is in frictional driving engagement with said pulley.

11. The anti-slack unit of claim 10 wherein said pulley drive motor is a rotary hydraulic motor and said support member moving means is an expansible chamber hydraulic motor.

12. The anti-slack unit of claim 2 wherein said conduit is a part of a fluid control circuit which includes valve means operable to maintain one level of biasing pressure to said motor when said drum is stationary and another level of biasing pressure to said motor when said drum is rotating.

13. The anti-slack unit of claim 1 which further includes a friction drive roller engageable with said cable, said roller being located adjacent the periphery of said pulley, and means for moving said roller toward said pulley so as to clamp said cable in frictional engagement with said pulley.

14. The anti-slack unit of claim 13 wherein said roller moving means comprises an expansible chamber fluid motor having a relatively movable piston and cylinder.

15. The anti-slack unit of claim 1 which further includes a pair of friction drive rollers cooperable with said pulley to clamp said cable between said rollers and said pulley, said rollers being rotatably mounted upon a rocker arm, said rocker arm being pivotally mounted upon a movable support, and means for moving said support toward said pulley so as to clamp said cable in frictional driving engagement with said pulley.

16. The anti-slack unit of claim 15 wherein said support moving means includes an expansible chamber fluid motor.

References Cited

UNITED STATES PATENTS

| | | | |
|---|---|---|---|
| 3,093,284 | 6/1963 | Mullin | 226—186 |
| 3,248,088 | 4/1966 | Benson | 254—172 |
| 3,309,064 | 3/1967 | Muller | 254—175.7 |

EVON C. BLUNK, *Primary Examiner.*

H. C. HORNSBY, *Assistant Examiner.*